United States Patent [19]

Nolden

[11] 4,181,507

[45] Jan. 1, 1980

[54] PROCESS FOR TREATMENT OF RESIDUAL GAS

[75] Inventor: Kurt Nolden, Essen, Fed. Rep. of Germany

[73] Assignee: Koppers Company, Inc., Pittsburgh, Pa.

[21] Appl. No.: 3,042

[22] Filed: Jan. 12, 1979

[51] Int. Cl.$^2$ .............................................. B01D 19/00
[52] U.S. Cl. ........................................... 55/73; 55/85; 423/574 R; 201/41
[58] Field of Search ....................... 55/73, 85; 201/41; 423/242, 573 R, 573 G, 574 R

[56] References Cited

U.S. PATENT DOCUMENTS

| | | | |
|---|---|---|---|
| 3,798,303 | 3/1974 | Tatterson | 423/574 R |
| 3,840,653 | 10/1974 | Diemer et al. | 55/73 |
| 4,150,104 | 4/1979 | Herpers et al. | 423/574 R |

Primary Examiner—Bernard Nozick
Attorney, Agent, or Firm—R. Lawrence Sahr

[57] ABSTRACT

A process is disclosed for the treatment of the residual gases which are produced when hydrogen sulfide is reduced, by combustion, to elementary sulfur by the Claus process. The residual gases are fed through a heated conduit and gas scrubber, wherein the temperature of those residual gases are maintained above the melting point of sulfur. A portion of the raw coke oven gas condensate is admitted to the gas scrubber to be returned to the coke oven battery main from the flushing liquid separator as flushing liquor. The residual gases are then conducted through the coke oven gas purification process equipment along with the raw coke oven gas where the residual gases are intermixed with the raw coke oven gas prior to tar separation.

5 Claims, 2 Drawing Figures

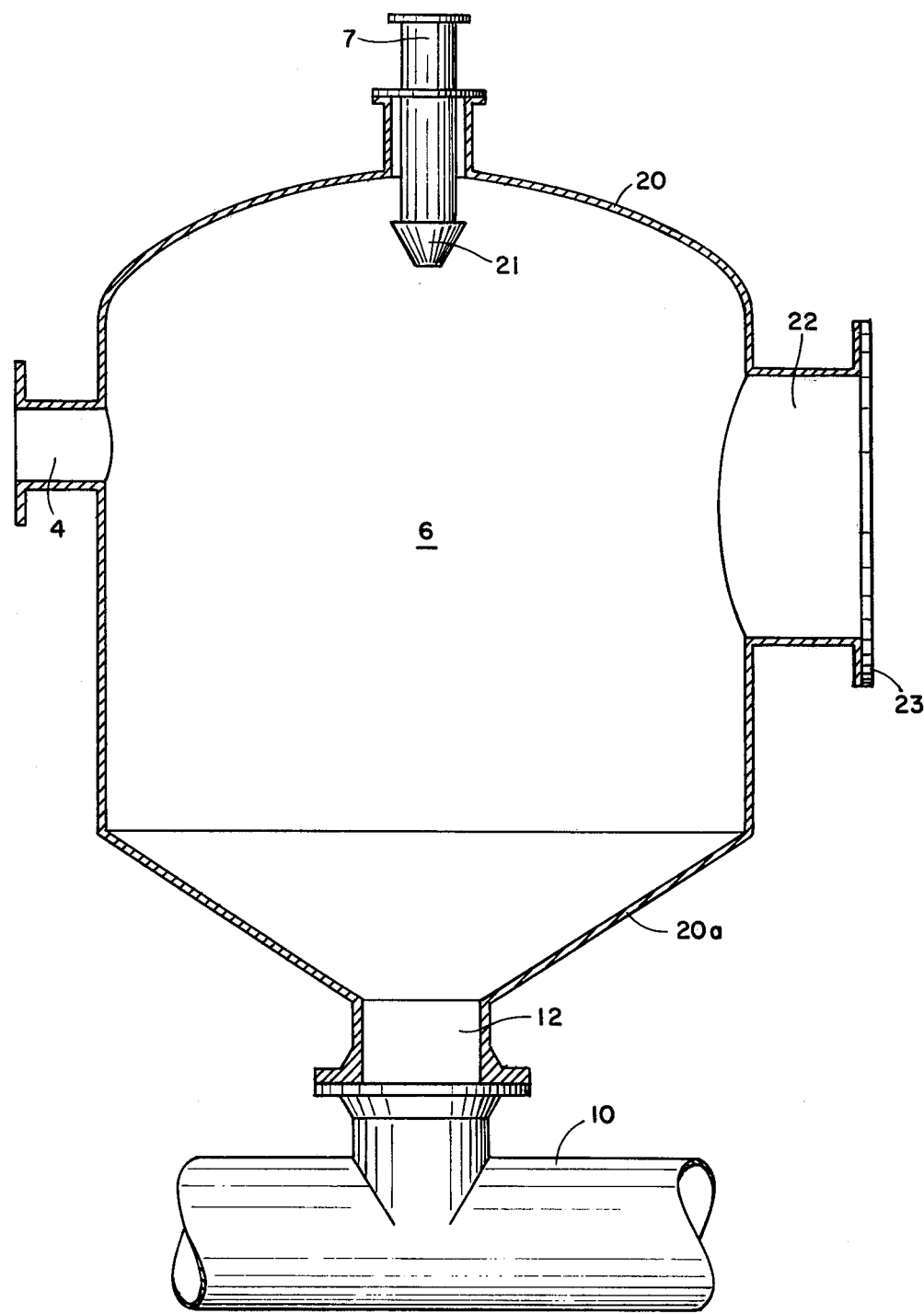

PROCESS FOR TREATMENT OF RESIDUAL GAS

BACKGROUND OF THE INVENTION

1. Field of the Invention

This invention relates generally to the processing of coke oven byproduct gases and, specifically, to the treatment of residual gases which are produced when hydrogen sulfide contained in those by-product gases is reduced to elementary sulfur by combustion by the Claus process.

2. Description of the Prior Art

Burning of the hydrogen sulfide produced in manufacturing processes, particularly the hydrogen sulfide that is separated from raw coke oven gas in the coke making process, is well known in the art. Typically, the hydrogen sulfide is reduced to elementary sulfur in accordance with the general formula:

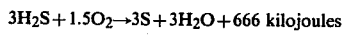

$$3H_2S + 1.5O_2 \rightarrow 3S + 3H_2O + 666 \text{ kilojoules}$$

The well-known Claus process is generally employed to effect this reduction, consisting primarly of incineration of the hydrogen sulfide in an oxygen atmosphere within a Claus furnace or burner.

When the above reaction takes place, however, a residual gas is produced which contains not only some elementary sulfur but also relatively large quantities of unreacted hydrogen sulfide, sulfur dioxide, and various other sulfur compounds. This residual gas, thus, cannot be discharged directly into the atmosphere due to environmental considerations.

Customarily, the residual gases are subjected to afterburning, in the course of which the hydrogen sulfide present therein, as well as the elementary sulfur, are converted to sulfur dioxide. The sulfur dioxide can then be discharged into the atmosphere, provided a very tall stack is utilized. The purpose of the tall stack is to reduce the concentration of sulfur dioxide in the ambient environment to the extent that government imposed maximum concentration standards are satisfied. However, both the plant afterburning facilities and the stack impose additional capital construction costs and increased operating expenses on the practice of the Claus process and, thus, a substantial economic burden based on environmental concerns.

A process for treating the residual gases has been proposed in German Offenlegungsschrift No. 2,257,023, according to which the residual gases are conducted, along with the raw coke oven gas, through the downstream coke oven battery gas purification process equipment, and, in this manner, the residual gases are treated using the apparatus and techniques for raw coke oven gas purification. The proposal of the above German patent application was to conduct the residual gases issuing from the Claus furnace through a line directly into the stream of raw coke oven gas coming from the coke oven battery main prior to subjecting that raw coke oven gas to a tar separation process. After the residual gases from the Claus furnace are combined with the raw coke oven gas directly from the main, the combination is treated with a cooling fluid, as is standard practice, utilizing a well-known type of primary cooler, followed by the usual by-product treatment of the cooled gases.

The teachings of the German application represent, in principle, a feasible method of treating the residual gases which can eliminate the afterburners and the stack. However, experience has shown that, in implementing this method, sulfur deposits accumulate in both the supply line for the residual gases as well as the processing lines for the raw coke oven gas. The sulfur deposits rapidly clog those lines, thus producing operating and maintenance problems for the entire plant.

The basis for the present invention is to provide an improvement to the method disclosed in the German application so as to eliminate to a large extent the problems inherent therein.

SUMMARY OF THE INVENTION

In the present invention, the residual gases from a Claus furnace are conducted to a gas scrubber via a heated pipeline. The heated pipeline, extending from the Claus furnace to the gas scrubber, maintains the residual gas at a temperature above the melting point of sulfur, preferably at about 130° C. Aqueous liquor, condensed from the raw coke oven gas, is conducted to the gas scrubber where it is utilized as the scrubbing medium to separate the condensable sulfur from the residual gas. The sulfur-bearing liquor and the residual gas are then immediately passed from the gas scrubber into the mainstream of raw coke oven gas where they are intimately included therein to flow to an aqueous liquor separator. In the aqueous liquor separator, the condensed sulfur separates into the tar phase which is drawn off as sulfur-enriched tar for further processing by well-known methods.

At this point the combined residual gas and raw coke oven gas still contains hydrogen sulfide. This combination is conducted into a primary cooler means which serves to further cool as well as scrub the gas. As the combination is cooled, further liquid condensate develops, carrying substantial quantities of the hydrogen sulfide with it. This liquid condensate is returned to the aqueous separator to be combined with the aqueous liquor therein which has been separated from the tar. This aqueous liquor is recycled to the gas scrubber as well as utilized for off-gas main flushing as is well known in the art.

The residual hydrogen sulfide remaining in the cooled combined residual gas and raw coke oven gas is effectively removed by way of the conventional downstream by-product processing equipment.

BRIEF DESCRIPTION OF THE DRAWINGS

FIG. 2 is a schematic representation of a gas scrubber particularly well suited for use in the process according to the invention.

DETAILED DESCRIPTION

Figure 1:
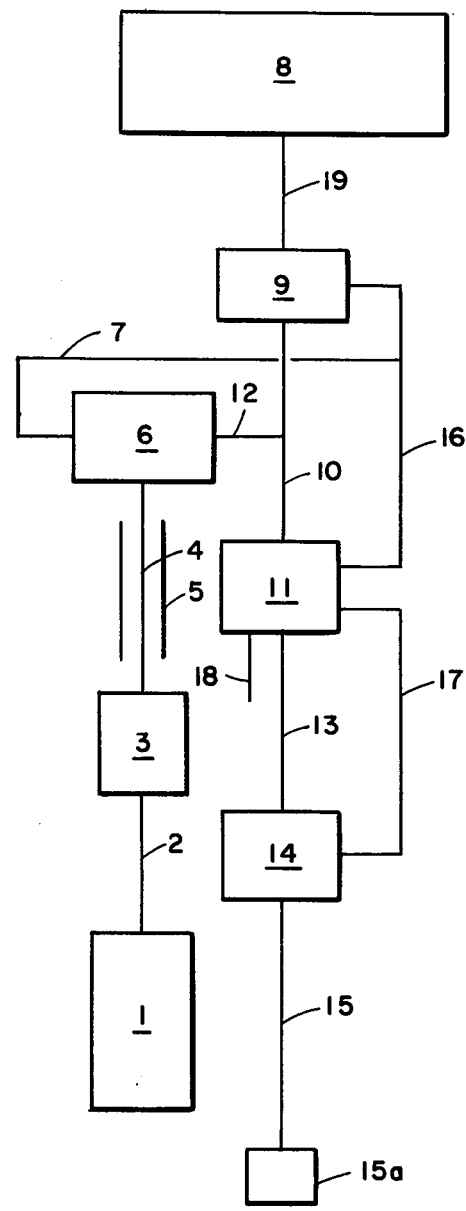
FIG. 1 represents a flow diagram of the process according to the invention.

The block flow diagram depicted in FIG. 1 represents the essential elements of the process according to the invention. Residual gases are generated in Claus furnace 1 and are conducted via line 2 to sulfur separator 3, wherein the majority of the elemental sulfur produced by the reduction reactor within the Claus furnace 1 is recovered. The residual gas is withdrawn from the sulfur separator 3 through pipeline 4 which is engaged with a heating means 5 whereby pipeline 4 is maintained at an elevated temperature. Heating means 5 may be any one of several well-known devices; for example, an electrical heating coil surrounding pipeline 4, or a steam jacket, through which steam is flowed, surrounding pipeline 4. Energy means (not shown) are provided to induce the heat in heating means 5. The heating means 5 is arranged and operable such that the temperature within pipeline 4 is maintained at a temperature above the melting point of sulfur, preferably at about 130° C. Due to the elevated temperature in pipeline 4, the sulfur and sulfur compounds flowing therethrough are prevented from condensing and forming buildup within pipeline 4. Pipeline 4 conducts the residual gas with its various sulfur and sulfur compound constituents to gas scrubber 6 at the elevated temperature. FIG. 2 illustrates the preferred embodiment of gas scrubber 6 which will be explained in detail hereinafter. Of course, gas scrubbers of alternate designs, as are known in the field of art, may be utilized.

A portion of the aqueous liquid condensate originating from in the raw coke oven gas is delivered to gas scrubber 6 through delivery line 7 and is returned to downcomer 10 which extends from main 9 of the coke oven battery 8 to the flushing liquor separator 11. The raw coke oven gas passing through downcomer 10 has not been subjected to a tar separation process at this point. The residual gas intimately combines with the raw coke oven gas flowing through the downcomer 10 and is delivered in combined form to the flushing liquor separator 11, where it is subjected to a tar separation process. The flushing liquor, or aqueous liquid condensate, generated by flushing liquor separator 11, is drawn off and recycled to the main 9 through conduit 16 where it is utilized in the usual manner for flushing purposes. However, a portion of that flushing liquor, or aqueous liquid condensate, from 2 percent to 10 percent, is drawn off of conduit 16 via delivery line 7 to be delivered to gas scrubber 6 as the scrubbing medium. The flushing liquor, or aqueous liquid condensate, containing the majority of the residual sulfur condensed out of the residual gas, as well as the residual gas itself, are conducted from the gas scrubber 6 to the downcomer 10 by way of the shortest possible pipe 12. The raw coke oven gas originates at coke oven battery 8 and travels through ascension pipe 19, through main 9 to downcomer 10. The combined raw coke oven gas and residual gas, along with the flushing liquor from the gas scrubber 6, travel concurrently to flushing liquor separator 11, which operates in a conventional manner to separate the aqueous liquid condensates as well as the tar from the raw coke oven gas. However, the sulfur and sulfur compounds, which have been condensed in the gas scrubber 6 and are carried to the flushing liquor separator 11 by the flushing liquor, combine with the heavy tar as the flushing liquor is decanted therefrom. The sulfur-enriched tar is then drawn off through line 18 to be processed in the normal manner as is known in the field of art.

The residual gas, still in combination with the raw coke oven gas, is conducted from the flushing liquor separator 11 via cooler line 13. The residual gas, at this point, still contains a substantial quantity of hydrogen sulfide. Cooler line 13 conducts the residual gas, combined with the raw coke oven gas, to primary cooler 14, wherein the gases are cooled, preferably in direct contact with water as is conventional practice in the coke oven industry. The cooling effected by the primary cooler 14 drops the gas temperature rapidly to, for example, 25° C. Such cooling serves to develop additional liquid condensates from both the raw coke oven gas and the residual gases, stripping substantially all of the remaining hydrogen sulfide from the residual gas and including it with the liquid condensate. This liquid condensate, including the stripped hydrogen sulfide, is conducted via line 17 back to the flushing liquor separator 11 where it joins the balance of the flushing liquor and is treated as previously explained.

The stripped and cooled residual gas combined with the cooled raw coke oven gas is conducted from the primary cooler 14 via line 15 to be treated by the conventional downstream coke oven by-products processing facilities 15a, which are capable of handling whatever small quantities of sulfur and sulfur compounds remaining in the gases at this point.

Referring to FIG. 2, the preferred embodiment of the gas scrubber 6 is there schematically illustrated. The residual gas enters enclosed housing 20 through line 4 which is positioned laterally about where represented in FIG. 2. Distribution nozzle 21 is positioned centrally at the top of and through enclosed housing 20, lying on the central vertical axis thereof. Alternately, a plurality of distribution nozzles may be symetrically arranged through the top of housing 20 to improve fluid distribution where gas flow patterns within housing 20 indicate such would be advantageous. Flushing liquor, or aqueous liquid condensate, is delivered to distribution nozzle 21 by way of delivery line 7 and evenly disbursed by distribution nozzle 21 throughout the residual gas within the housing 20. The interior of housing 20 is vacant except for the protrusion thereinto of distribution nozzle 21, so as to forestall the danger of sulfur deposits resulting from the sulfur and sulfur compounds included in the residual gas. The lower portion 20a of housing 20 takes the form of a frusto-conical section with a decreasing diameter from top to bottom, terminating at the bottom with a fluid connection to pipe 12. Pipe 12, as previously mentioned, is as short as possible. This is to further forestall the accumulation of sulfur within the system and to effect a rapid inclusion of the residual gas and flushing liquor into downcomer 10. On the side of housing 20, opposite the position of line 4, is a manhole access aperture 22, covered by a lid 23 to seal the interior of the housing 20, provided for cleaning and maintenance access to the housing 20. Such access is also provided to enable the cleaning and maintenance of distribution nozzle 21.

According to the provisions of the patent statutes, the principle, preferred embodiment and mode of operation of the present invention have been illustrated and described. However, it is to be understood that, within the scope of the appended claims, the present invention may be practiced otherwise than as specifically illustrated and described.

What is claimed is:

1. A process for treating the residual gas, containing sulfur and sulfur compounds, which is produced when hydrogen sulfide is reduced by incineration to elementary sulfur by the Claus process, comprising:

(a) conducting said residual gas from a Claus furnace to a gas scrubbing means while simultaneously maintaining said residual gas at a temperature above the melting point of sulfur;

(b) scrubbing said residual gas within said gas scrubbing means, utilizing liquid flushing liquor as the scrubbing medium, whereby a portion of said sulfur and said sulfur compounds condense and combine with said flushing liquor;

(c) simultaneously conducting said residual gas and said flushing liquor combined with said portion of said sulfur and said sulfur compounds rapidly from said gas scrubbing means to the downcomer of a coke oven battery;

(d) intimately combining within said downcomer said residual gas with raw coke oven gas, as generated by a plurality of coke ovens, prior to removing the tar from said raw coke oven gas;

(e) conducting said combination of residual gas and raw coke oven gas, along with said flushing liquor from said gas scrubbing means, to flushing liquor separator means;

(f) separating, within said flushing liquor separator means, said tar, from said flushing liquor from said gas scrubbing means, and the formed aqueous condensate from said raw coke oven gas, by decanting, said separated tar combining with and containing said portion of said sulfur and said sulfur compounds within said flushing liquor separator means, stripping said residual gas of said portion of said sulfur and said sulfur compounds;

(g) conducting said separated flushing liquor to the main of said coke oven battery via a conduit means; said conduit means including a tributary forming a fluid connection between said conduit means and said gas scrubbing means;

(h) conducting a portion of said flushing liquor from said conduit means through said tributary to said gas scrubbing means, said portion of said flushing liquor to be utilized as said scrubbing medium by said gas scrubbing means;

(i) withdrawing said tar, enriched with said portion of said sulfur and said sulfur compounds, from said flushing liquor separator means;

(j) conducting said stripped residual gas and said raw coke oven gas from said flushing liquor separator means to a primary cooler means;

(k) cooling said stripped residual gas and said raw coke oven gas within said primary cooler means, condensing substantially all of the remaining aqueous components of said raw coke oven gas into liquid form and condensing substantially all of the remaining sulfur and sulfur compounds within said residual gas, and combining said remaining sulfur and sulfur compounds with said condensed aqueous components of said raw coke oven gas;

(l) conducting said condensed aqueous components of said raw coke oven gas combined with said remaining sulfur and sulfur compounds from said primary cooler means to said flushing liquor separator means wherein said condensed aqueous components of said raw coke oven gas combined with said remaining sulfur and sulfur compounds are added to said flushing liquor within said flushing liquor separator prior to said flushing liquor having said tar separated therefrom;

(m) treating said condensed aqueous components of said raw coke oven combined with said remaining sulfur and sulfur compounds, as conducted from said primary cooler means to said flushing liquor separator means and added to said flushing liquor, as described in elements (f), (g) and (h) hereinbefore; and (n) conducting said stripped residual gas and raw coke oven gas, absent substantially all of the said remaining aqueous components of said raw coke oven gas and absent substantially all of said remaining sulfur and sulfur compounds, to downstream conventional coke oven gas by-product processing facilities.

2. The process described in claim 1 wherein said residual gas being conducted to said gas scrubbing means is simultaneously maintained at a temperature of about 130° C.

3. The process described in claim 1 wherein said portion of said flushing liquor being conducted from said conduit means through said tributary to said gas scrubbing means comprises about 2 percent to 10 percent of said flushing liquor being conducted to the said main of said coke oven via said conduit means.

4. The process described in claim 1 wherein said scrubbing said residual gas comprises:

(a) introducing said residual gas laterally into an enclosed housing, said housing which is vacant;

(b) evenly disbursing flushing liquor, via at least one distribution nozzle, throughout said residual gas within said enclosed housing;

(c) condensing the majority of the residual sulfur contained in said residual gas;

(d) combining said majority of said residual sulfur with said flushing liquor within said enclosed housing; and (e) conducting said residual gas, absent said majority of said residual sulfur, and said flushing liquor combined with said majority of said residual sulfur, from said enclosed housing substantially directly to said downcomer.

5. The process described in claim 4 wherein said enclosed housing is positioned above and directly adjacent to said downcomer and wherein said residual gas, absent said majority of said residual sulfur, and said flushing liquor combined with said majority of said residual sulfur, are conducted to said downcomer by gravity flow.

* * * * *

UNITED STATES PATENT AND TRADEMARK OFFICE
CERTIFICATE OF CORRECTION

PATENT NO. : 4,181,507

DATED : Jan. 1, 1980

INVENTOR(S) : Kurt Nolden

It is certified that error appears in the above-identified patent and that said Letters Patent are hereby corrected as shown below:

Page 1, Item Number [73]

Assignee: Krupp-Koppers, GmbH, Essen, Federal Republic of Germany

Signed and Sealed this

Sixth Day of May 1980

[SEAL]

Attest:

SIDNEY A. DIAMOND

Attesting Officer     Commissioner of Patents and Trademarks